United States Patent
Rasmussen et al.

(10) Patent No.: US 8,018,114 B2
(45) Date of Patent: Sep. 13, 2011

(54) GENERATOR ROTOR WITH IMPROVED WEDGES

(75) Inventors: Roy D. Rasmussen, Janesville, WI (US); Scott R. Ganong, Stillman Valley, IL (US); Glenn C. Lemmers, Jr., Loves Park, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 260 days.

(21) Appl. No.: 12/411,468

(22) Filed: Mar. 26, 2009

(65) Prior Publication Data
US 2010/0244614 A1 Sep. 30, 2010

(51) Int. Cl.
*H02K 3/487* (2006.01)
*H02K 3/48* (2006.01)
(52) U.S. Cl. ...... 310/214; 310/61; 310/271; 310/156.28
(58) Field of Classification Search .......... 310/214, 310/61, 156.28, 271; *H02K 3/487, 3/48*
See application file for complete search history.

(56) References Cited

U.S. PATENT DOCUMENTS

| | | | |
|---|---|---|---|
| 4,427,910 A * | 1/1984 | Richter et al. | 310/214 |
| 4,433,261 A * | 2/1984 | Nashiki et al. | 310/156.28 |
| 4,982,123 A | 1/1991 | Raad | |
| 5,027,500 A | 7/1991 | Kecke | |
| 5,430,340 A | 7/1995 | Shih | |
| 6,327,762 B2 | 12/2001 | Kelleher | |
| 6,331,745 B2 | 12/2001 | Blakelock | |
| 6,465,928 B1 | 10/2002 | Shervington | |
| 6,634,836 B2 | 10/2003 | Nolan | |
| 6,683,398 B2 | 1/2004 | Tong et al. | |
| 6,727,634 B2 * | 4/2004 | Tornquist et al. | 310/270 |
| 6,791,230 B2 * | 9/2004 | Tornquist et al. | 310/214 |
| 6,838,778 B1 | 1/2005 | Kandil | |
| 6,882,079 B2 | 4/2005 | Kilpatrick | |
| 6,979,929 B2 * | 12/2005 | Tornquist et al. | 310/214 |
| 7,061,154 B2 * | 6/2006 | McDowall et al. | 310/214 |
| 7,262,537 B2 | 8/2007 | Worley | |
| 7,342,331 B2 * | 3/2008 | Down et al. | 310/214 |
| 2008/0169710 A1 * | 7/2008 | Hattori et al. | 310/214 |

* cited by examiner

*Primary Examiner* — Quyen Leung
*Assistant Examiner* — Michael Andrews
(74) *Attorney, Agent, or Firm* — Carlson, Gaskey & Olds, PC

(57) ABSTRACT

A wedge for use in a generator rotor includes a wedge body having a generally triangular shape with flat surfaces, and such that when the wedge is placed in a generator rotor, the flat surfaces will define circumferential extents of the wedge body relative to a rotational axis of the rotor, and said flat surfaces extending to a radially outermost extent of the wedge body. A wedge and winding combination, a generator rotor, a generator and a method all using the wedges are disclosed and claimed.

22 Claims, 4 Drawing Sheets

GENERATOR ROTOR WITH IMPROVED WEDGES

BACKGROUND OF THE INVENTION

This application relates to a generator wedge for use in a generator rotor.

Typically, a generator includes a rotor having a plurality of field coils, or windings. The rotor is driven to rotate by some source of rotation, such as a turbine rotor. The rotor rotates in proximity to a stator, and the rotation of the rotor generates current in stator windings. Generator wedges are used to support the windings under centrifugal load.

The wedges are typically radially supported by a main field lamination stack. Given the significant centrifugal loading within a high speed generator, the stresses on the main field lamination often drive the selection of a lamination material, and result in a compromise as to magnetic properties as well as lamination geometry.

There is a need for a generator rotor and wedge design reducing or eliminating the need for compromise in lamination magnetic properties and geometries due to rotor wedge retention considerations.

SUMMARY OF THE INVENTION

A wedge for use in a generator rotor includes a wedge body having a generally triangular shape with flat surfaces, and such that when the wedge is placed in a generator rotor, the flat surfaces will define circumferential extents of the wedge body relative to a rotational axis of the rotor. The flat surfaces extend to a radially outermost extent of the wedge body.

A wedge and winding combination for use in a generator rotor includes a wedge body having a generally triangular shape with flat surfaces, and such that when the wedge is placed in a generator rotor, the flat surfaces will define circumferential extents of the wedge body relative to a rotational axis of the rotor, and the flat surfaces extend to a radially outermost extent of the wedge body. The flat surfaces contact a mating flat surface on each of a pair of windings.

A generator rotor includes a main lamination stack defining an axis. Pairs of circumferentially spaced windings have wedges placed circumferentially between each pair. The wedges include a wedge body having a generally triangular shape with flat surfaces. The flat surfaces define circumferential extents of the wedge body relative to the axis of the rotor, and extend to a radially outermost extent of the wedge body. The flat surfaces of said wedges sit radially outwardly of surfaces on the windings to provide support for the windings. The flat surfaces of the wedges also sit radially outwardly of mating surfaces on the main lamination stack.

A generator includes a stator, and a rotor including a main lamination stack defining an axis. Pairs of circumferentially spaced windings have wedges placed circumferentially between each pair. The wedges include a wedge body having a generally triangular shape with flat surfaces. The flat surfaces define circumferential extents of the wedge body. The flat surfaces extend to a radially outermost extent of the wedge body. The flat surfaces of the wedges sit radially outwardly of surfaces on the windings to provide support for the windings. The flat surfaces of the wedges also sit radially outwardly of mating surfaces on the main lamination stack.

A method of forming a generator rotor for an electrical generator includes the steps of defining a main lamination stack having openings spaced circumferentially about a central axis of the main lamination stack. Opposed pairs of circumferentially spaced windings are placed within the openings in the main lamination stack. Generally triangular wedge bodies are inserted circumferentially intermediate each winding in each pair of the windings. The wedges are designed to have surfaces which sit radially outwardly of the windings and surfaces of the main lamination stack which define the opening such that the wedges define a radial support surface for the main lamination stack, and the windings. A containment sleeve is force-fit around the wedges and the main lamination stack to provide radial support for the wedges.

These and other features of the present invention can be best understood from the following specification and drawings, the following of which is a brief description.

DETAILED DESCRIPTION

Figure 1:
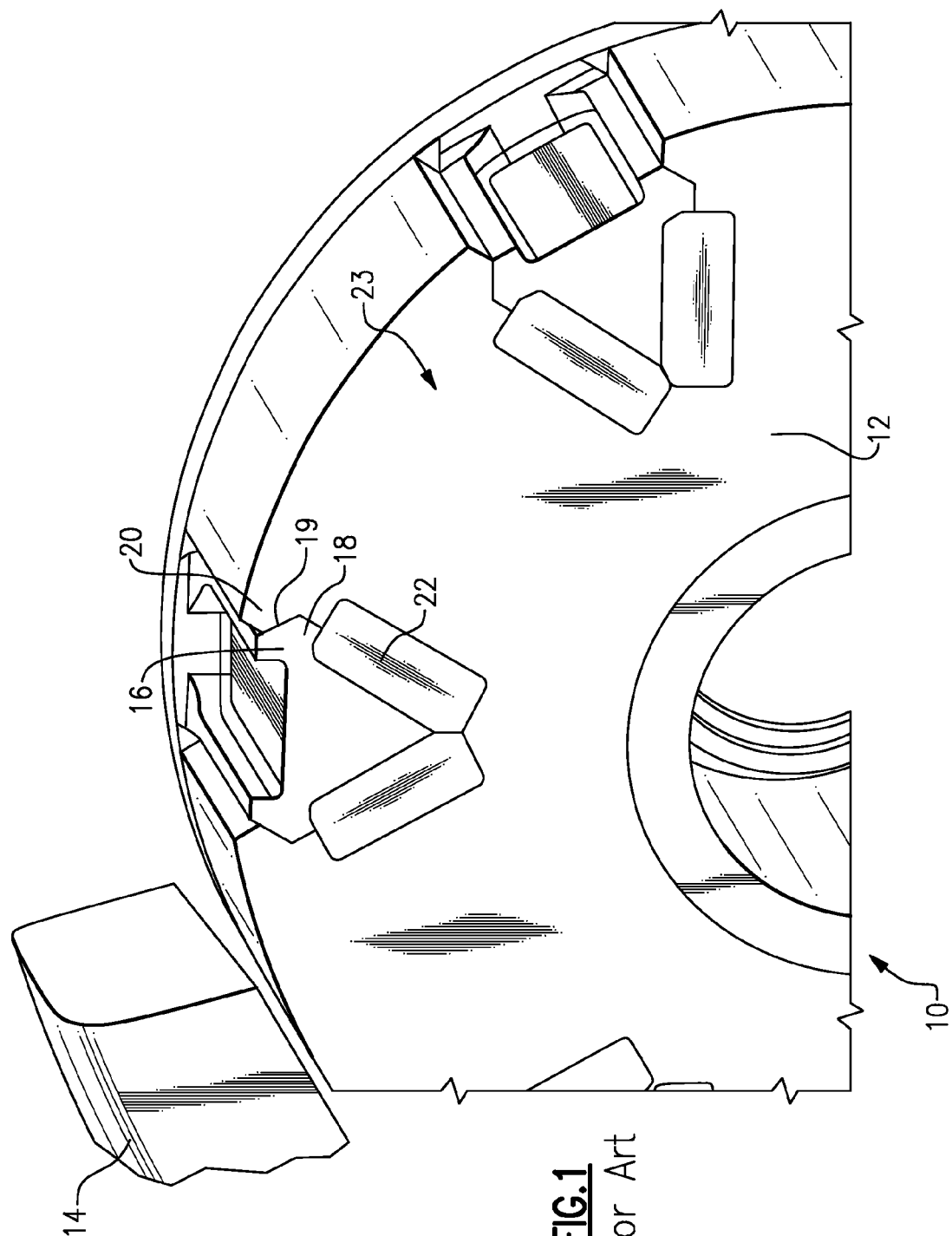
FIG. 1 shows a portion of a prior art generator.

A portion of a known generator 10 is illustrated in FIG. 1, somewhat schematically. As known, a rotor 12 is driven to rotate, and rotates adjacent to a stator 14, shown schematically. Windings 22 and main lamination stack 23 are driven to rotate with the rotor, and current is generated in the stator 14.

As known, wedges 16 provide a guide surface with circumferential ends 18 to support the windings 22. In addition, radial support for the wedge 16 is provided by edges 20 of the lamination stack 23, which contact ends 18 of the wedge 16 at a radially outer surface 19. As mentioned above, since the lamination stack provides radial support for the wedges 16, the material utilized for the lamination stack is sometimes compromised to provide mechanical properties for this support, rather than being selected for magnetic properties dictated by its main function.

Figure 2:
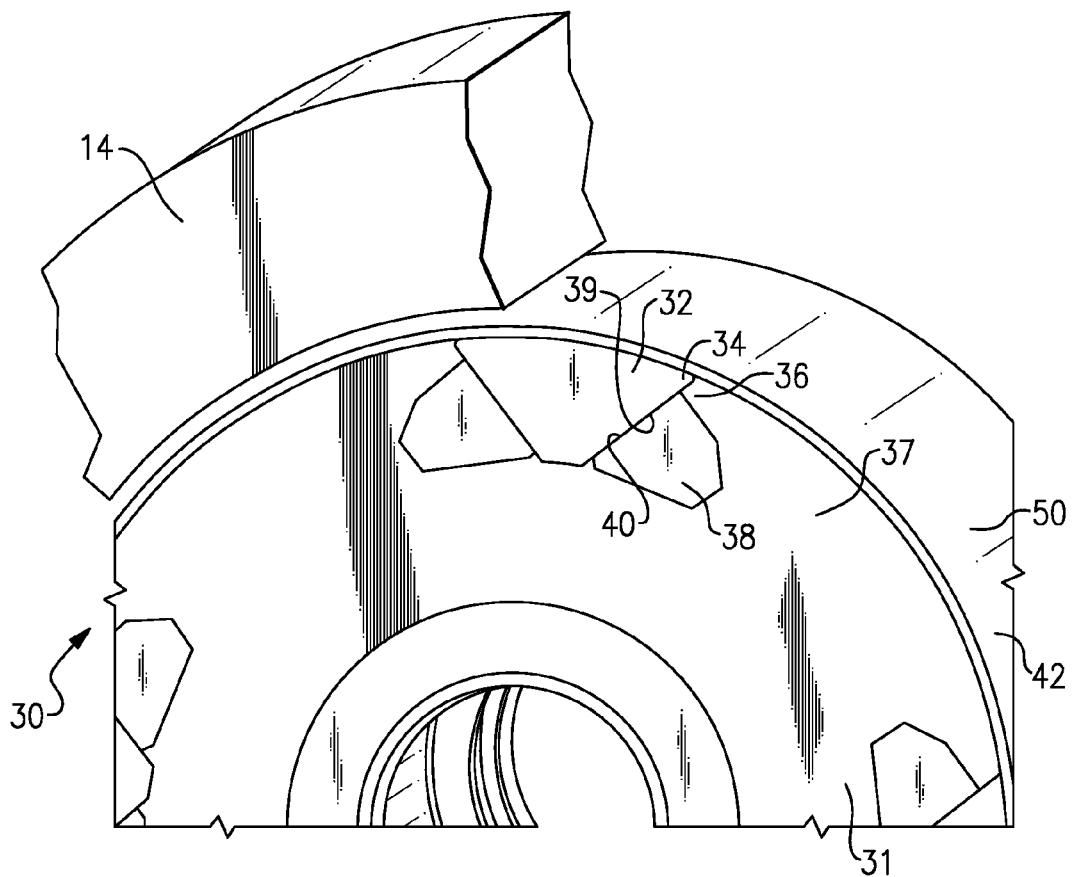
FIG. 2 is a portion of the inventive generator.

FIG. 2 shows one potential embodiment of the inventive generator 30 which eliminates reliance upon the main field lamination stack for wedge radial support. In the embodiment of FIG. 2, a rotor 31 rotates adjacent to a stator 14. The wedge 32 has circumferential edge surfaces 34 that sit along a radially outer surface 36 of the lamination stack 37. The terms radial and circumferential are defined relative to a rotational axis of the rotors. Generally flat side surfaces 39 extend to a radially outermost extent of the wedge 32 and sit along a flat surface 40 of the windings 38, and a flat outer surface of the portion 36 of the lamination stack 37. A containment sleeve 50 surrounds the lamination stack 37 and the wedges 32. In the FIG. 2 embodiment, the wedges provide radial support to the lamination stack 37, and to the windings 38. Thus, the problem discussed above of compromising the material of the lamination stuck such that it can provide support to the wedges is eliminated.

Figure 3:
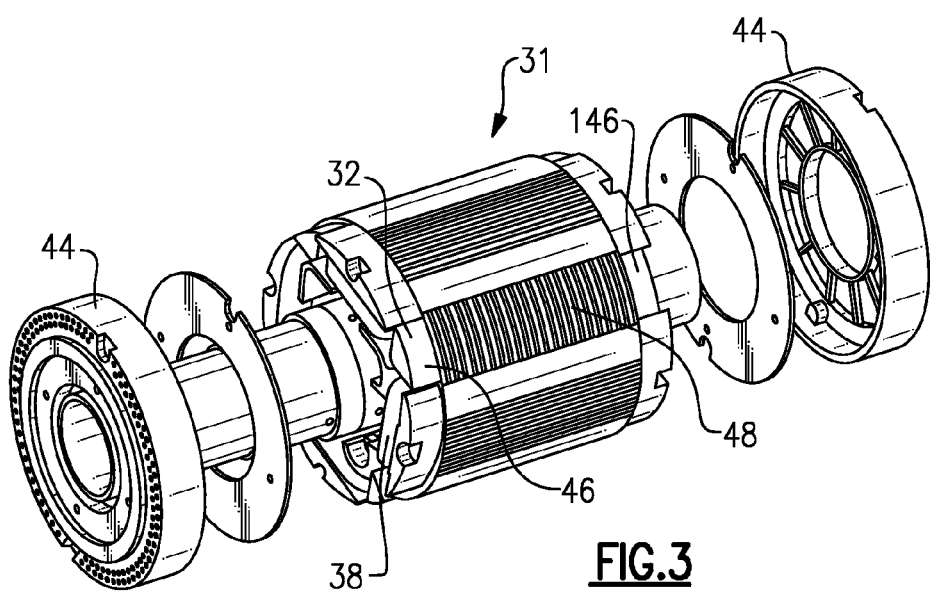
FIG. 3 is an exploded view of a portion of a rotor.

As can be appreciated from FIG. 3, the assembled rotor 31 has plates 44 that sit on end surfaces 46 and 146 of the wedges 32. An axial central portion 48 of the wedges 32 extends radially outwardly beyond the ends 46 and 146. The plates 44 provide a reaction surface for radial forces on the wedges, and at the end surfaces 46 and 146.

Figure 4:
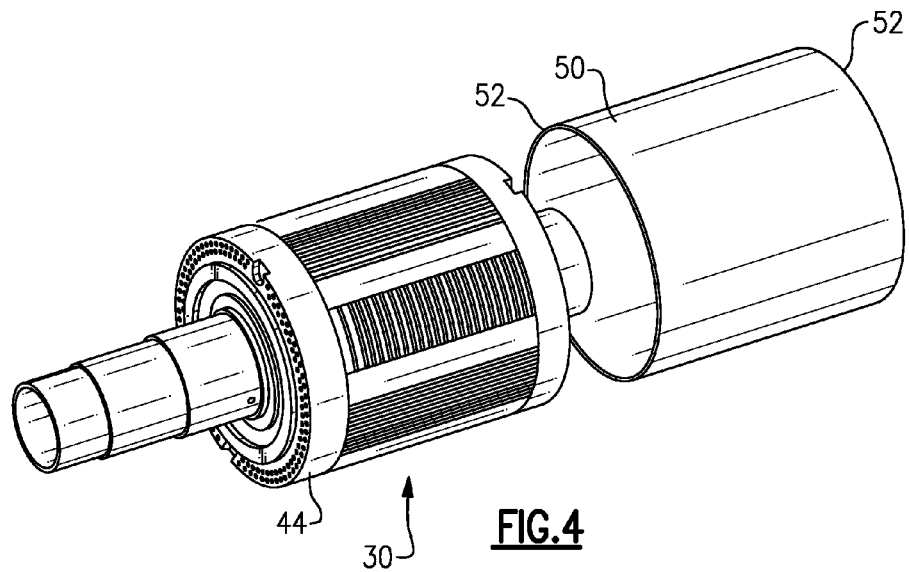
FIG. 4 is an exploded view showing a portion of a rotor with a containment sleeve.

As shown in FIG. 4, the containment sleeve 50 has ends 52 that will cover the plates 44 and the remainder of the rotor 31 when assembled. The containment sleeve 50 may be formed of a carbon fiber composite, or other suitable materials. The containment sleeve 50 is an interference fit on the wedges 32, the plates 44, and the lamination stack 37. Thus, the containment sleeve provides the radial support for the wedges in this embodiment.

Figure 5:
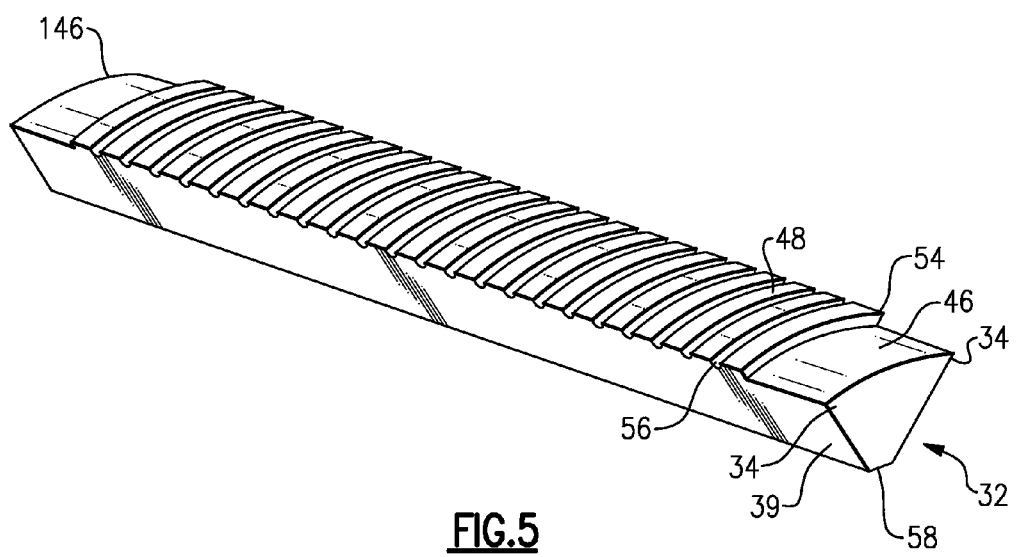
FIG. 5 shows the wedge of this invention.

The wedge 32 is shown in greater detail in FIG. 5. The wedge body is typically formed of an appropriate aluminum, and may be of a material similar to that which has been utilized in the past. In one embodiment, 2024-T851 aluminum is utilized, although other nonmagnetic materials may also be selected. End surfaces 46 and 146 are spread along a central axis of the rotor that will receive the wedge 32.

A ledge 54 connects the surfaces 46 and 48. The cross-section of the wedge 32 extends between the circumferential edges 34, and includes the generally flat surfaces 39, and a flattened apex 58. The apex 58 is at a tangent relative to a radius extending from the central axis of the rotor, while the outer surfaces 46 (and 146) and 48 are curved on a circular arc about that same axis.

Grooves 56 are formed in the surface 48 and reduce eddy current losses to improve the generator efficiency.

The cross-section of the wedge 32 may be extruded to have one or more hollow cavities (not shown).

Figure 6A:
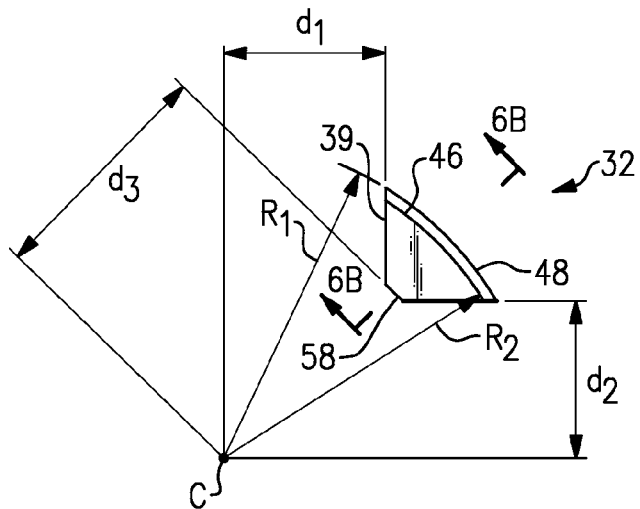
FIG. 6A shows an end view of the inventive wedge.

As shown in FIG. 6A, the wedge 32 has a generally triangular shape, and is centered about a generating point C. The generating point C is the origin of a radius R1, which extends to the top surface 48, and a radius R2, which extends to the surface 46 (and would also extend to the surface 146). The side surfaces 39 are defined by moving a distance d1 and d2 from a horizontal and vertical axis, and then defining a parallel line to the vertical and horizontal axes. In this manner, the shape of the wedge body is defined. In one embodiment, the distances d1 and d2 were both selected to be 1.325" (33.6 mm), nominally. This was in a wedge wherein the radius R1 was selected to be 2.625" (66.7 mm), and the radius R2 was selected to be 2.535" (64.4 mm). In embodiments of this invention, a ratio of the d1 (or d2) to R1 ranges between 0.45 and 0.55.

Also, as can be seen, the end 58 of the wedge 32 is truncated. The truncated end 58 could be defined as being tangent to a radius from the generating point C. A line is drawn that is parallel to this tangent, and at a distance d3 to this tangent d3 was 1.98" (50.3 mm) in one embodiment. The ratio of the distance d3 to R1 is between 0.65 and 0.75 in embodiments of this invention. The resulting wedge shape will have beneficial attributes, and will be of an adequate size to provide the support required for both the windings and lamination stack with this shape.

Figure 6B:
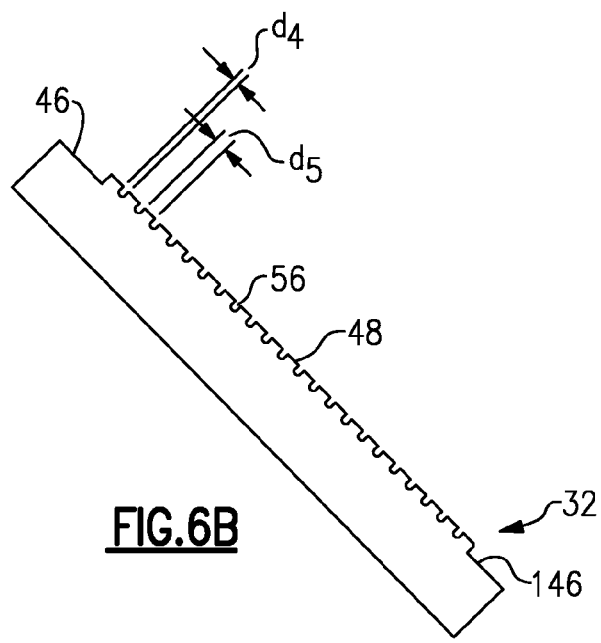
FIG. 6B is a cross-sectional view along line 6B-6B of FIG. 6A.

As shown in FIG. 6B, the grooves 56 and the intermediate surfaces 48 have respective lengths d4 and d5; d5 is greater than d4. In one embodiment, d4 was 0.060" (1.52 mm) and d5 was 0.128" (3.25 mm). In embodiments, the ratio of d4 to d5 is selected to be between 0.4 and 0.5.

Figure 6C:
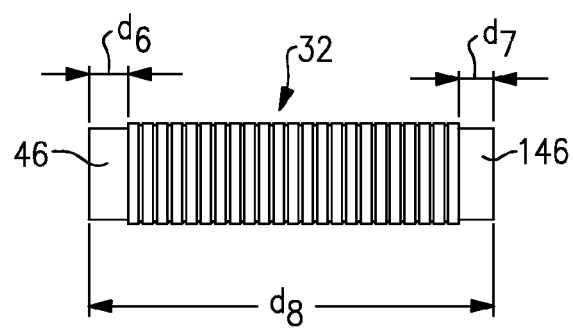
FIG. 6C is a top view of the wedge.

As shown in FIG. 6C, the end surfaces 46 and 146 are of different lengths. End surface 46 is of a length d6, while end surface 146 is of a length d7. The length of surface 46 is longer as there is a winding cross-over geometry which must be accommodated at that end. The windings must cross-over and return toward the other end, and additional space is necessary at this end. In one embodiment, the length d6 was 0.499" while the length d7 was 0.420" (10.7 mm). This was in a wedge having an overall length d8 of 5.199" (132 mm). In embodiments, the ratio of d6 to d7 is between 1.15 and 1.25.

The wedge as disclosed in this application is able to provide robust radial support for the lamination stack and the windings. In this manner, the lamination stack can be designed primarily or solely for magnetic properties, and compromises due to the requirement of providing radial support for the wedge may be reduced or eliminated.

In a sense, the lamination plates could be said to have openings formed by their side surfaces 36, and for accommodating the windings 38. The windings 38 and the wedges 32 are inserted into those openings. The wedge then provides radial support to the winding and the lamination stack. The sleeve is then force-fit around the assembly (after the plates 44 are mounted) and the sleeve provides radial support to the wedges 32.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A wedge for use in a generator rotor comprising:
a wedge body having a generally triangular shape with flat surfaces, and such that when the wedge is placed in a generator rotor, the flat surfaces will define circumferential extents of the wedge body relative to a rotational axis of the rotor;
said flat surfaces extending to a radially outermost extent of the wedge body; and
the wedge body has an apex that is a flattened surface that will be at a tangent to the axis of the rotor, surfaces that will be the radially outermost surface of the wedge body when the wedge is mounted in a generator are curved about a circular arc relatively to the axis, the radially outermost surface of the wedge is formed with a plurality of grooves, the plurality of grooves extending for an axial length, and the radially outermost surface defining surfaces intermediate each of said grooves, with said surfaces extending for an axial length that is greater than the axial length of said grooves.

2. The wedge as set forth in claim 1, wherein said axial length of said grooves is selected to be between 0.4 and 0.5 of said axial length of said surfaces intermediate said grooves.

3. The wedge as set forth in claim 1, wherein said wedge has end surfaces at each axial end that are curved about a circular arc, and said radially outermost surface curved about a circular arc spaced at a radial greater distance from the axis than said end surfaces, and wherein one end surface of said wedge extends for a greater axial length than an opposed axial end surface.

4. The wedge as set forth in claim 3, wherein a ratio of the lengths of said end surfaces is between 1.15 and 1.25.

5. The wedge as set forth in claim 1, wherein a generating point is used to define the flat surfaces of said wedge, and a radius is defined to a radial outermost surface of the wedge, the flat surfaces being defined by a horizontal and a vertical axis extending from said generating point, and then defining a line at a spaced point from each of said vertical and horizontal axes, said defined lines each being drawn parallel to said vertical and horizontal axes, and a distance between said vertical and horizontal axes and said defined lines being selected such that a ratio of said distances to said radius is between 0.45 and 0.55, and said defined lines being used to locate said flat surfaces.

6. The wedge as set forth in claim 5, wherein a distance to said flattened apex is also defined by moving from a tangent from said generating point a third distance, and said third distance being selected to have a ratio relative to said radius of 0.65 to 0.75.

7. A wedge and winding combination for use in a generator rotor comprising:
   a wedge body having a generally triangular shape with flat surfaces, and such that when the wedge is placed in a generator rotor, the flat surfaces will define circumferential extents of the wedge body relative to a rotational axis of the rotor, and said flat surfaces extending to a radially outermost extent of the wedge body;
   a pair of windings with said flat surfaces contacting a mating flat surface on each said winding, and
   the wedge body has an apex that is a flattened surface that will be at a tangent to the axis of the rotor, surfaces that will be the radially outermost surface of the wedge body when the wedge is mounted in a generator are curved about a circular arc relatively to the axis, the radially outermost surface of the wedge is formed with a plurality of grooves, the plurality of grooves extending for an axial length, and the radially outermost surface defining surfaces intermediate each of said grooves, with said surfaces extending for an axial length that is greater than the axial length of said grooves.

8. The wedge and winding combination as set forth in claim 7, wherein said axial length of said grooves is selected to be between 0.4 and 0.5 of said axial length of said surfaces intermediate said grooves.

9. The wedge and winding combination as set forth in claim 7, wherein said wedge has end surfaces at each axial end that are curved about a circular arc, and said radially outermost surface is curved about a circular arc spaced at a radial greater distance from the axis than said end surfaces, and wherein one end surface of said wedge extends for a greater axial length than an opposed axial end surface.

10. A generator rotor comprising:
    a main lamination stack defining an axis;
    pairs of circumferentially spaced windings;
    wedges placed circumferentially between each said pair of windings, said wedges including a wedge body having a generally triangular shape with flat surfaces, said flat surfaces defining circumferential extents of the wedge body relative to the axis of the rotor, and said flat surfaces extending to a radially outermost extent of the wedge body;
    said flat surfaces of said wedges sitting radially outwardly of surfaces on said windings to provide support for said windings, and said flat surfaces of said wedges also sitting radially outwardly of mating surfaces on said main lamination stack; and
    each wedge body has an apex that is a flattened surface at a tangent to the axis, a radially outermost surface of the wedge body is curved about a circular arc relatively to the axis, the radially outermost surface of the wedge formed with a plurality of grooves, the plurality of grooves extending for an axial length, and the radially outermost surface defining surfaces intermediate each of said grooves, with said surfaces extending for an axial length that is greater than the axial length of said grooves.

11. The rotor as set forth in claim 10, wherein a containment sleeve surrounds said main laminations and said wedges.

12. The rotor as set forth in claim 11, wherein plates are received on opposed axial ends of said wedges, and said sleeve surrounding said plates.

13. The rotor as set forth in claim 11, wherein said sleeve is formed of a carbon fiber composite.

14. The rotor as set forth in claim 10, wherein a generating point is used to define the flat surfaces of said wedge, and a radius is defined to a radial outermost surface of the wedge, the flat surfaces being defined by a horizontal and a vertical axis extending from said generating radius, and then defining a line at a spaced point from each of said vertical and horizontal axes, said defined lines each being drawn parallel to said vertical and horizontal axes, and a distance between said vertical and horizontal axes and said defined lines being selected such that a ratio of said distances to said radius is between 0.45 and 0.55, and said defined lines setting said flat surfaces, and wherein a distance to said flattened apex is also defined by moving from a tangent to a radius from said generating point a third distance, and said third distance being selected relative to have a ratio relative to said radius of 0.65 to 0.75.

15. The generator rotor as set forth in claim 10, wherein said axial length of said grooves is selected to be between 0.4 and 0.5 of said axial length of said surfaces intermediate said grooves.

16. The generator rotor as set forth in claim 10, wherein said wedge has end surfaces at each axial end that are curved about a circular arc, and said radially outermost surface is curved about a circular arc spaced at a radial greater distance from the axis than said end surfaces, and wherein one end surface of said wedge extends for a greater axial length than an opposed axial end surface.

17. A generator comprising:
    a stator;
    a rotor including a main lamination stack defining an axis, pairs of circumferentially spaced windings, wedges placed circumferentially between each said pair of windings, said wedges including a wedge body having a generally triangular shape with flat surfaces defining circumferential extents of the wedge body, and said flat surfaces extending to a radially outermost extent, said flat surfaces of said wedges sitting radially outwardly of surfaces on said windings to provide support for said windings, and said flat surfaces of said wedges also sitting radially outwardly of mating surfaces on said main lamination stack; and
    each wedge body has an apex that is a flattened surface at a tangent to the axis, a radially outermost surface of the wedge body is curved about a circular arc relatively to the axis, the radially outermost surface of the wedge is formed with a plurality of grooves, the plurality of grooves extending for an axial length, and the radially outermost surface defining surfaces intermediate each of said grooves, with said surfaces extending for an axial length that is greater than the axial length of said grooves.

18. The generator as set forth in claim 17, wherein a containment sleeve surrounds said main laminations and said wedges.

19. The generator as set forth in claim 18, wherein plates are received on opposed axial ends of said wedges, and said sleeve surrounding said plates.

20. The generator as set forth in claim 17, wherein said axial length of said grooves is selected to be between 0.4 and 0.5 of said axial length of said surfaces intermediate said grooves.

21. The generator as set forth in claim 17, wherein said wedge has end surfaces at each axial end that are curved about a circular arc, and said radially outermost surface is curved about a circular arc spaced at a radial greater distance from the axis than said end surfaces, and wherein one end surface of said wedge extends for a greater axial length than an opposed axial end surface.

22. A method of forming a generator rotor for an electrical generator comprising the steps of:
  (a) defining a main lamination stack, said main lamination stack having openings spaced circumferentially about a central axis of said main lamination stack;
  (b) placing opposed pairs of circumferentially spaced windings within said openings in said main lamination stack; and
  (c) inserting a generally triangular wedge body circumferentially intermediate each winding in each pair of said windings, and said wedge body being designed to have surfaces which sit radially outwardly of said windings and surfaces of said main lamination stack which define said opening such that said wedge defines a radial support surface for said main lamination stack, and said windings, the wedge body has an apex that is a flattened surface at a tangent to the central axis, a radially outermost surface of the wedge when the wedge curved about a circular arc relatively to the central axis, the radially outermost surface is formed with a plurality of grooves, and the plurality of grooves extending for an axial length, and the radially outermost surface defining surfaces intermediate each of said grooves, with said surfaces extending for an axial length that is greater than the axial length of said grooves.

\* \* \* \* \*